US011807950B2

(12) United States Patent
Shalaev et al.

(10) Patent No.: US 11,807,950 B2
(45) Date of Patent: Nov. 7, 2023

(54) SOLAR THERMOPLASMONIC NANOFURNACES AND METHOD FOR MAKING AND USING SAME

(71) Applicants: Purdue Research Foundation, West Lafayette, IN (US); Palacky University, Olomouc (CZ); University of Erlangen-Nuremberg, Erlangen (DE)

(72) Inventors: Vladimir M. Shalaev, West Lafayette, IN (US); Zhaxylyk Kudyshev, West Lafayette, IN (US); Alexandra Boltasseva, West Lafayette, IN (US); Alberto Naldoni, Olomouc (CZ); Alexander Kildishev, West Lafayette, IN (US); Luca Mascaretti, Olomouc (CZ); Štěphán Kment, Olomouc (CZ); Radek Zbořil, Olomouc (CZ); Jeong Eun Yoo, Erlangen (DE); Patrik Schmuki, Erlangen (DE)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/734,934

(22) Filed: May 2, 2022

(65) Prior Publication Data

US 2022/0333266 A1 Oct. 20, 2022

Related U.S. Application Data

(62) Division of application No. 16/865,365, filed on May 3, 2020, now Pat. No. 11,319,640.

(60) Provisional application No. 62/843,058, filed on May 3, 2019.

(51) Int. Cl.
 C25D 11/26 (2006.01)
 G02B 5/00 (2006.01)
 C01B 21/076 (2006.01)

(52) U.S. Cl.
 CPC ............ *C25D 11/26* (2013.01); *C01B 21/076* (2013.01); *G02B 5/008* (2013.01)

(58) Field of Classification Search
 None
 See application file for complete search history.

(56) References Cited

U.S. PATENT DOCUMENTS

2005/0224360 A1* 10/2005 Varghese ............... C25D 11/26
 205/171

FOREIGN PATENT DOCUMENTS

CN 102534630 A * 7/2012
CN 109609993 A 4/2019

OTHER PUBLICATIONS

Xie, et al., Sep. 16, 2013, Materials Science and Engineering B, vol. 178, pp. 1443-1451 (Year: 2013).*

(Continued)

*Primary Examiner* — Seth Dumbris
(74) *Attorney, Agent, or Firm* — Maginot, Moore & Beck LLP

(57) ABSTRACT

A thermoplasmonic device includes a titanium film and a plurality of titanium nitride tube elements disposed on the titanium film. Each of the titanium nitride tube elements includes an open top and a titanium nitride bottom. Each of the titanium nitride tube elements has titanium nitride tubular middle portion that extends from the open top to the titanium nitride bottom.

19 Claims, 10 Drawing Sheets

(56) References Cited

OTHER PUBLICATIONS

International Energy Agency, "Market Report Series: Renewables 2018: Analysis and Forecasts to 2023," 2018 (211 pages).
International Renewable Energy Agency (IRENA), "Renewable Energy Technologies: Cost Analysis Series: Concentrating Solar Power," vol. 1: Power Sector, Issue 2/5, Jun. 2012 (48 pages).
Maier, S. A. et al., "Plasmonics—A Route to Nanoscale Optical Devices," Advanced Materials, Oct. 2001, vol. 13, No. 19, pp. 1501-1505 (5 pages).
Swearer, D. F. et al., "Heterometallic antenna—reactor complexes for photocatalysis," PNAS, Aug. 2016, vol. 113, No. 32, pp. 8916-8920 (5 pages).
Brongersma, M. L. et al., "The Case for Plasmonics," Science, Apr. 2010, vol. 328, pp. 440-441 (2 pages).
Haffner, C. et al., "Low-loss plasmon-assisted electro-optic modulator," Nature, Apr. 2018, vol. 556, pp. 483-486 (17 pages).
Govorov, A. O. et al., "Gold nanoparticle ensembles as heaters and actuators: melting and collective plasmon resonances," Nanoscale Research Letters, 2006, vol. 1, pp. 84-90 (7 pages).
Hirsch, L. R. et al., "Nanoshell-mediated near-infrared thermal therapy of tumors under magnetic resonance guidance," PNAS, Nov. 2003, vol. 100, No. 23, pp. 13549-13554 (6 pages).
Adleman, J. R. et al., "Heterogenous Catalysis Mediated by Plasmon Heating," Nano Letters, 2009, vol. 9, No. 12, pp. 4417-4423 (7 pages).
Neumann, O. et al., "Solar Vapor Generation Enabled by Nanoparticles," ACS Nano, 2013, vol. 7, No. 1, pp. 42-49 (8 pages).
Zhou, L. et al., "3D self-assembly of aluminium nanoparticles for plasmon-enhanced solar desalination," Nature Photonics, Jun. 2016, vol. 10, pp. 393-398 (7 pages).
Righini, M. et al., "Parallel and selective trapping in a patterned plasmonic landscape," Nature Physics, Jul. 2007, vol. 3, pp. 477-480 (4 pages).
Berthelot, J. et al., "Three-dimensional manipulation with scanning near-field optical nanotweezers," Nature Nanotechnology, Apr. 2014, vol. 9, pp. 295-299 (11 pages).
Grigorenko, A. N., et al., "Nanometric Optical Tweezers Based on Nanostructured Substrates," Nature Photonics, Jun. 2008, vol. 2, pp. 365-370 (6 pages).
Challener, W. A. et al., "Heat-assisted Magnetic Recording by a Near-field Transducer with Efficient Optical Energy Transfer," Nature Photonics, Apr. 2009, vol. 3, pp. 220-224 (5 pages).
Zhou, N. et al., "Plasmonic Near-field Transducer for Heat-assisted Magnetic Recording," Nanophotonics, 2014, vol. 3, No. 3, pp. 141-155 (15 pages).
Guler, U. et al., "Plasmonics on the Slope of Enlightenment: the Role of Transition Metal Nitrides," Faraday Discussions, 2015, vol. 178, pp. 71-86 (16 pages).
Chou, J. B. et al., "Enabling Ideal Selective Solar Absorption with 2D Metallic Dielectric Photonic Crystals," Advanced Materials, 2014, vol. 26, pp. 8041-8045 (5 pages).
Arpin, K. A. et al., "Three-dimensional self-assembled photonic crystals with high temperature stability for thermal emission modification," Nature Communications, Oct. 2013, vol. 4, Article No. 2630 (8 pages).
Guler, U. et al., "Refractory Plasmonics," Science, Apr. 2014, vol. 344, Issue 6181, pp. 263-264 (2 pages).
Gui, L. et al., "Nonlinear Refractory Plasmonics with Titanium Nitride Nanoantennas," Nano Letters, 2016, vol. 16, pp. 5708-5713 (6 pages).
Briggs, J. A. et al., "Temperature-dependent Optical Properties of Titanium Nitride," Applied Physics Letters, Mar. 2017, vol. 110, 101901-1-101901-5 (5 pages).
Naik, G. V. et al., "Alternative Plasmonic Materials: Beyond Gold and Silver," Advanced Materials, 2013, vol. 25, pp. 3264-3294 (31 pages).
Naldoni, A. et al., "Broadband Hot-Electron Collection for Solar Water Splitting with Plasmonic Titanium Nitride," Advanced Optical Matters, 2017, vol. 5 (11 pages).

Reddy, H. et al., "Temperature-dependent optical properties of gold thin films," Optical Materials Express, 2016, vol. 6, pp. 2776-2802 (27 pages).
Riboni, F. et al., "Aligned metal oxide nanotube arrays: Key-aspects of anodic TiO2 nanotube formation and properties," Nanoscale Horizons, 2016, vol. 1, pp. 445-466 (22 pages).
Guler, U. et al., "Nanoparticle plasmonics: going practical with transition metal nitrides," Materials Today, May 2015, vol. 18, No. 4, pp. 227-237 (11 pages).
Celanovic, I. et al., "Two-dimensional Tungsten Photonic Crystals as Selective Thermal Emitters," Applied Physics Letters, 2008, vol. 92, 193101 (3 pages).
Chen, K.-P. et al., "Drude Relaxation Rate in Grained Gold Nanoantennas," Nano Letters, 2010, vol. 10, pp. 916-922 (7 pages).
Chawla, J. S. et al., "Effective Electron Mean Free Path in TiN(001)," Journal of Applied Physics, 2013, vol. 113, 063704-1-063704-6 (6 pages).
Johnson, P. B. et al., "Optical Constants of the Noble Metals," Physical Review B., Dec. 1972, vol. 6, No. 12, pp. 4370-4379 (10 pages).
Olmon, R. L. et al., "Optical dielectric function of gold," Physical Review B., 2012, vol. 86, 235147-1-235147-9 (9 pages).
Yang, H. U. et al., "Optical dielectric function of silver," Physical Review B., 2015, vol. 91, 235137-1-235137-11 (11 pages).
Chawla, J. S. et al., "Electron scattering at surfaces and grain boundaries in Cu thin films and wires," Physical Review B. 2011, vol. 84, 235423-1-235423-10 (10 pages).
Yoo, J. E. et al., "Critical Factors in the Anodic Formation of Extremely Ordered Titania Nanocavities," Journal of the Electrochemical Society, Jun. 2019, vol. 166, No. 11, C3389-C3398 (10 pages).
Yang, R. et al., "Investigations on structural, elastic, thermodynamic and electronic properties of TiN, Ti2N and Ti3N2 under high pressure by first-principles," Journal of Physics and Chemistry of Solids, May 2016, vol. 98, 10-19 (10 pages).
Lábár, J. L. et al., "Electron Diffraction Based Analysis of Phase Fractions and Texture in Nanocrystalline Thin Films, Part III: Application Examples," Microscopy and Microanalysis, 2012, vol. 18, 406-420 (15 pages).
Lábár, J. L., "Consistent indexing of a (set of) single crystal SAED pattern(s) with the ProcessDiffraction program," Ultramicroscopy, 2005, vol. 103, 237-249 (13 pages).
Ohsaka, T. et al., "Raman Spectrum of Anatase, TiO2," Journal of Raman Spectroscopy, 1978, vol. 7, No. 6, pp. 321-324 (4 pages).
Ferrari, A. C. et al., "Interpretation of Raman spectra of disordered and amorphous carbon," Physical Review B., May 2000, vol. 61, No. 20, 14095-14107 (13 pages).
Christopher, P. et al., "Visible-light-enhanced Catalytic Oxidation Reactions on Plasmonic Silver Nanostructures," Nature Chemistry, 2011, vol. 3, 467-472 (6 pages).
Baffou, G. et al., "Thermo-plasmonics: Using Metallic Nanostructures as Nano-sources of Heat," Laser Photonics Rev. 7, 2013, No. 2, 171-187 (17 pages).
Lal, S. et al., "Nanoshell-Enabled Photothermal Cancer Therapy: Impending Clinical Impact," Accounts of Chemical Research, Dec. 2008, vol. 41, No. 12, 1842-1851 (10 pages).
Boyd, D. A. et al., "Plasmon-Assisted Chemical Vapor Deposition," Nano Letters, 2006, vol. 6, No. 11, 2592-2597 (6 pages).
Cao, L. et al., "Plasmon-Assisted Local Temperature Control to Pattern Individual Semiconductor Nanowires and Carbon Nanotubes," Nano Letters, 2007, vol. 7, No. 11, 3523-3527 (5 pages).
Ndukaife, J. C. et al., "Long-range and Rapid Transport of Individual Nano-objects by a Hybrid Electrothermoplasmonic Nanotweezer," Nature Nanotechnology, Jan. 2016, vol. 11, 53-59 (8 pages).
Mutlu, C. et al., "Thermoplasmonic Ignition of Metal Nanoparticles," Nano Letters, 2018, vol. 18, 1699-1706 (8 pages).
Rinnerbauer, V. et al., "Metallic Photonic Crystal Absorber-Emitter for Efficient Spectral Control in High-Temperature Solar Thermophotovoltaics," Advanced Energy Materials, 2014, vol. 4, 1400334 (10 pages).

(56) References Cited

OTHER PUBLICATIONS

Ishii, S. et al., "Titanium Nitride Nanoparticles as Plasmonic Solar Heat Transducers," The Journal of Physical Chemistry C, 2016, vol. 120, 2343-2348 (6 pages).
Machine Translation of CN109609993A. (5 Pages).
Braic, L. et al., "Titanium Oxynitride Thin Films with Tunable Double Epsilon-Near-Zero Behavior for Nanophotonic Applications," Applied Materials & Interfaces, 2017, vol. 9, 29857-29862 (6 pages).
Li, W. et al., "Refractory Plasmonics with Titanium Nitride: Broadband Metamaterial Absorber," Advanced Materials, 2014, vol. 26, 7959-7965 (7 pages).
Reddy, H. et al., "Temperature-Dependent Optical Properties of Single Crystalline and Polycrystalline Silver Thin Films," ACS Photonics, 2017, vol. 4, 1083-1091 (9 pages).
Reddy, H. et al., "Temperature-Dependent Optical Properties of Plasmonic Titanium Nitride Thin Films," ACS Photonics, 2017, vol. 4, 1413-1420 (8 pages).
Mayadas, A. F. et al., "Electrical-Resistivity Model for Polycrystalline Films: the Case of Arbitrary Reflection at External Surfaces," Physical Review B, Feb. 1970, vol. 1, No. 4, 1382-1389 (8 pages).
Mayadas, A. F. et al., "Electrical Resistivity Model for Polycrystalline Films: The Case of Specular Reflection at External Surfaces," Applied Physics Letters, 1969, vol. 14, 345-347 (3 pages).
Piallat, F., "Investigation of TiN Thin Film Oxidation Depending on the Substrate Temperature at Vacuum Break," Journal of Vacuum Science & Technology A, 2016, vol. 34, No. 5, 051508 (7 pages).
Yoo, J. E. et al., "Self-Organized Arrays of Single Metal Catalyst Particles in TiO2 Cavities: a Highly Efficient Photocatalytic System," Angewandte Zuschriften, 2013, vol. 125, 7662-7665 (4 pages).
Lábár, J. L., "Electron Diffraction Based Analysis of Phase Fractions and Texture in Nanocrystalline Thin Films, Part I: Principles," Microscopy & Microanalysis, 2008, vol. 14, 287-295 (9 pages).
Lábár, J. L., "Electron Diffraction Based Analysis of Phase Fractions and Texture in Nanocrystalline Thin Films, Part II: Implementation," Microscopy & Microanalysis, 2009, vol. 15, 20-29 (10 pages).
Spengler, W. et al., "Resonant Raman Scattering in a Superconducting Transition Metal Compound—TiN," Solid State Communications, 1975, vol. 17, No. 1, 19-22 (4 pages).
Spengler, W. et al., "Raman Scattering, Superconductivity, and Phonon Density of States of Stoichiometric and Nonstoichiometric TiN," Physical Review B., Feb. 1978, vol. 17, No. 3, 1095-1101 (7 pages).
Jostsons, A. et al., "The Ordered Structure of Ti3O," Acta Crystallographica, 1968, Sect. B, vol. 24, 211-213 (3 pages).
Guler, U. et al., "Plasmonic Titanium Nitride Nanostructures via Nitridation of Nanopatterned Titanium Dioxide," Advanced Optical Materials, 2017, vol. 5, 1600717 (6 pages).
Ren, Peng, and Xiuchun Yang. "Synthesis and Photo-Thermal Conversion Properties of Hierarchical Titanium Nitride Nanotube Mesh for Solar Water Evaporation." Solar Rrl 2.4 (2018): 1700233.

\* cited by examiner

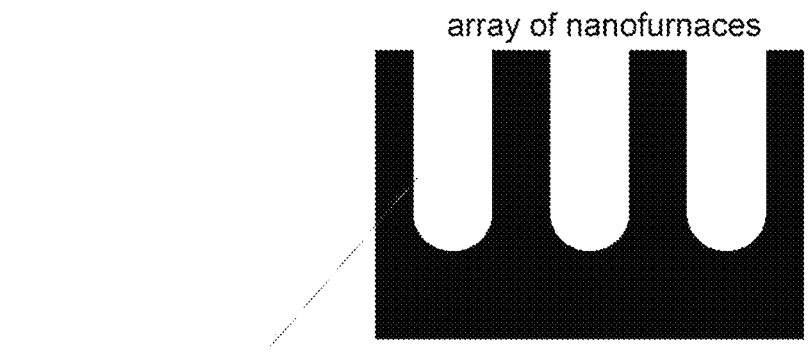
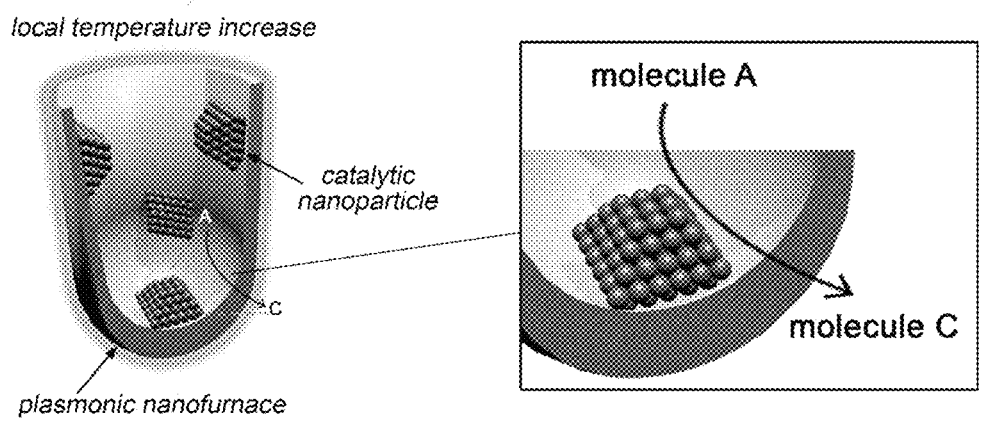
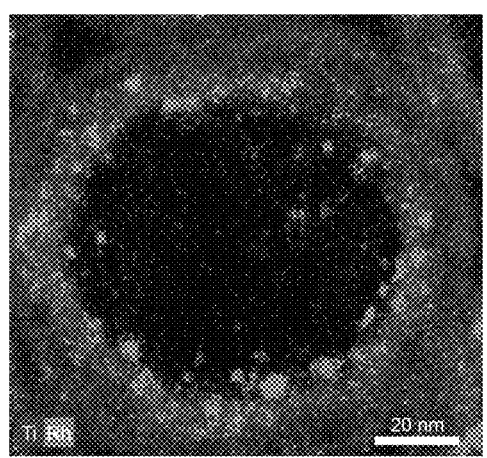
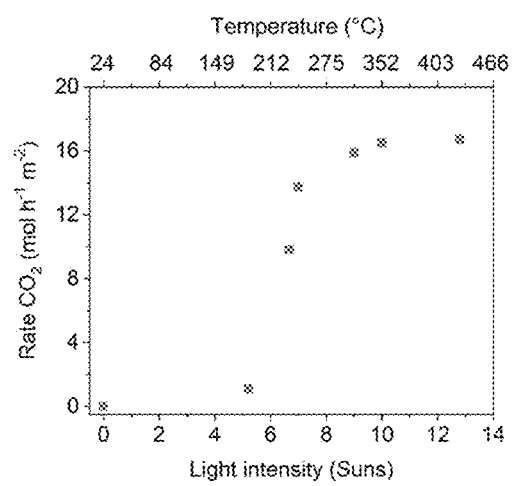
FIG. 11a
FIG. 11b
FIG. 11c

SOLAR THERMOPLASMONIC NANOFURNACES AND METHOD FOR MAKING AND USING SAME

PRIORITY CLAIM

This application is a divisional of U.S. patent application Ser. No. 16/865,365 filed May 3, 2020, which in turn claims priority to U.S. Provisional Application No. 62/843,058, filed on May 3, 2019, the entire disclosures of both of which are incorporated herein by reference.

STATEMENT OF GOVERNMENT INTEREST

This invention was made with government support under grant number DMR-1506775 awarded by the National Science Foundation, and grant number FA9550-17-1-0243 awarded by the Air Force Office of Scientific Research. The government has certain rights in the invention.

TECHNICAL FIELD

The present invention relates to nanometer devices that convert solar energy into heat energy.

BACKGROUND

Heat generation and management are among the most critical energy issues on a global scale. The heating and cooling sector are responsible for 52% of overall energy consumption, 10% of which is produced from renewables. Solar-thermal technologies account for only 7% of the renewable heat generation, highlighting the extreme need for the development of novel and efficient solar-to-heat energy conversion technologies.

Present solar thermal technologies, such as parabolic troughs and solar towers, operate in the temperature range 300-600° C. to generate renewable electricity. Such high temperatures can only be attained by concentrated solar powers of the order of 100-1000 Suns, which can, at present, only be achieved by large area solar plants (i.e., 50 hectares for a 50 MW implant) that in turn requires extremely high capital costs (i.e., US$400 million).

Solar thermal technologies hold promise, not only for generating renewable electricity, but also for the development of chemical implants that use the high-generated temperatures to catalyze sustainable chemical transformations, such carbon dioxide reduction, hydrogen generation, and liquid fuels synthesis through the Fischer-Tropsch process. However, high-temperature catalysis may only become market-competitive through the development of compact, cost-effective thin-film devices that need lower concentrated solar power (and thus cheaper optical components) to reach high operating temperatures.

Plasmonics or metal nano-optics, offers an unprecedented control over light at the nanoscale and has stimulated both new fundamental research and application concepts in applied optics, photochemistry and nanoelectronics. Thermoplasmonics, a subfield of plasmonics, utilizes the optical losses associated with the dissipation of surface plasmons that are excited in metal nanostructures upon external light illumination and uses these conducting structures as nanosources of heat. In other words, thermoplasmonics technology utilizes the strongly localized temperature increase due to the decay of surface plasmons upon light absorption in metal nanostructures.

Since the early 2000s, the heating of metal nanoparticles using light has found applications in photothermal cancer therapy and other biomedical areas. Since then, the usage of local heating and photothermal effects have led to new diverse applications such as heterogeneous catalysis, cavitation, steam generation, desalination, and distillation of liquid solvents. Nevertheless, the applicability of nanoparticle-based systems is limited by their low stability at high temperatures which eventually causes the nanoparticles to aggregate.

Recent advances in the development of thermoplasmonic thin film systems have overcome some of the intrinsic limitations of nanoparticles and have found applications in areas such as templated growth of nanostructures, optical nanotweezers, heat-assisted magnetic recording, and energetic materials. However, the thermoplasmonic devices reported to date use micrometer-sized patterns and focused laser excitation to achieve the desired conditions and temperatures, and are therefore unsuitable for practical applications requiring large-scale solar-to-heat energy conversion. However, photonic crystals are an interesting exception because they can be fabricated on large areas without compromising their exceptional optical properties. Photonic crystals have been exploited as efficient absorber/emitter for thermophotovoltaics and solar thermophotovoltaics.

SUMMARY OF THE DISCLOSURE

In embodiments described herein, at least some of the above-stated shortcomings are addressed by large-scale films made by refractory (high-temperature stable) sub-wavelength titanium nitride cylindrical cavities that act as plasmonic "nanofurnaces" capable of reaching temperatures above six hundred degree Celsius under moderate concentrated solar irradiation. In at least some embodiments, the demonstrated nanofurnaces show near-unity solar absorption in the visible and near infrared spectral ranges and a maximum thermoplasmonic solar-to-heat conversion efficiency of 68%. The nanofurnaces enable controlling chemistry at the nanometer scale with zeptoliter volume precision as well as processes such as melting of inorganic deposits to produce homogeneous conformal coatings. Solar refractory thermoplasmonic nanofurnaces open a way to more efficient solar-to-heat energy conversion for activation of heterogeneous catalytic processes, thermoelectrics technology, and thermophotovoltaic devices.

In one embodiment, a thermoplasmonic device includes a titanium film and a plurality of titanium nitride tube elements disposed on the titanium film. Each of the titanium nitride tube elements includes an open top and a titanium nitride bottom. Each of the titanium nitride tube elements has titanium nitride tubular middle portion that extends from the open top to the titanium nitride bottom.

At least one embodiment is a method of scalable, flexible fabrication of solar absorber devices. A method to fabricate solar absorbers devices on square-centimeter areas produces refractory thermoplasmonic titanium nitride (TiN) nanostructures having size and period one order of magnitude lower than that typical of photonic crystals. Two-dimensional (2D) sub-wavelength cylindrical nanocavity arrays generate temperatures higher than 600° C. under moderate concentrated solar power. Each nanocavity mimics a nanofurnace (or nanoreactor) enabling thermally induced nanochemistry with zeptoliter volume precision. In other words, the 2D sub-wavelength cylindrical nanocavity arrays according to the present disclosure can perform as broadband absorbers capable of concentrating the dissipated optical power in zeptoliter volumes to generate the high temperatures.

These nanofurnaces can also be used to induce the thermoplasmonic melting and decomposition of an iron organometallic precursor and new C—C bond formation, ultimately leading to the deposition of a few-nanometer-thick conformal layer of crystalline hermatite inside the nanofurnace walls. Metal nanoparticle decorated TiN nanofurnaces according to the present disclosure can catalyze CO oxidation reaction at a solar-to-heat thermoplasmonic efficiency of up to 63%.

DESCRIPTION OF THE FIGURES

FIG. 11a is a representation of an array of TiN nanofurnaces, a perspective cut-away view a single TiN nanofurnace, and an enlarged detail view of a portion of a single TiN nanofurnace of the present disclosure for use in performing solar thermal catalysis.

FIG. 11b is a high angle annular dark field scanning TEM image and EDS elemental mapping image of the nanofurnace employed for solar thermal catalysis.

FIG. 11e is a graph of catalytic activity for CO oxidation of the TiN nanofurnace in FIG. 11a.

DETAILED DESCRIPTION

Figure 1:
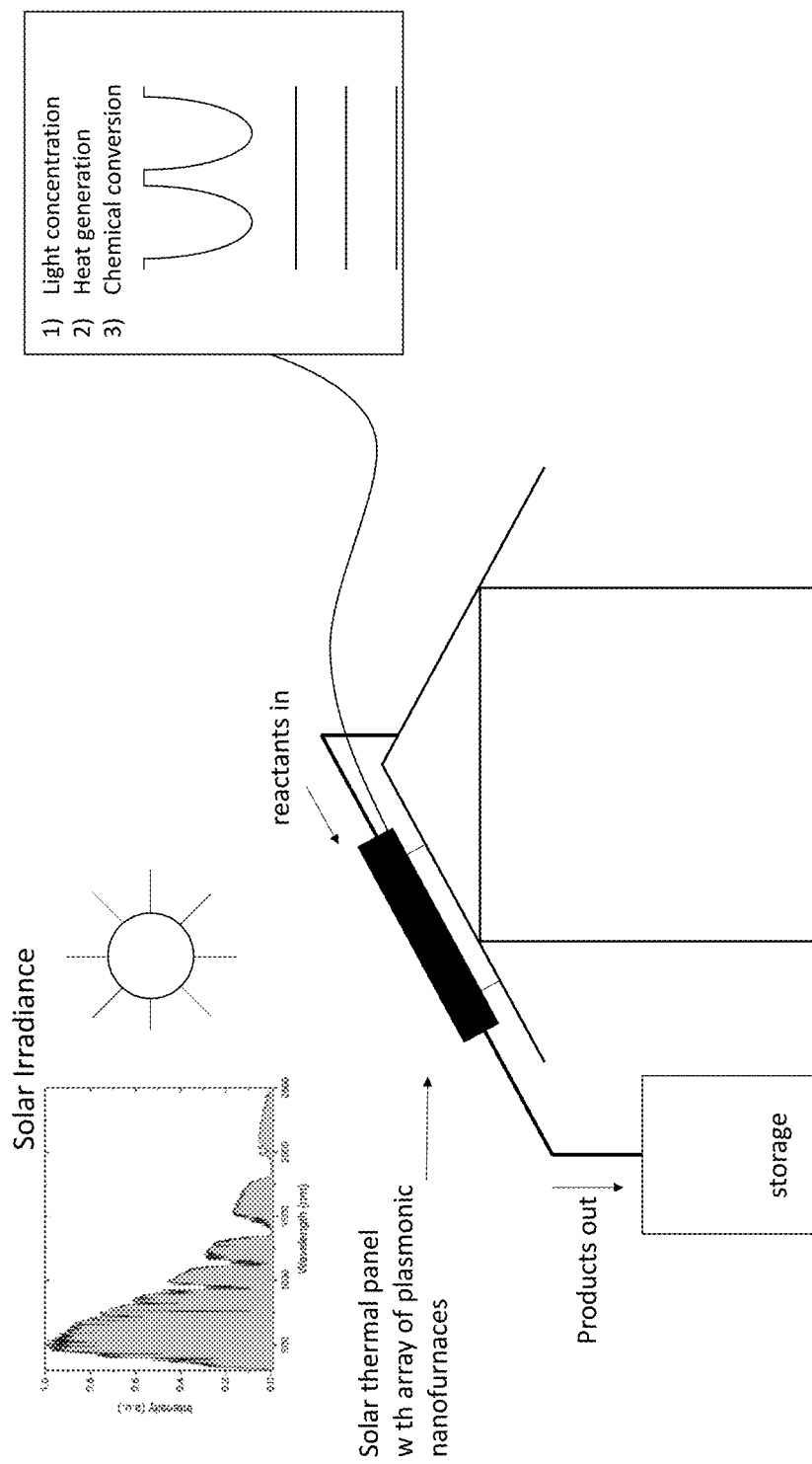
FIG. 1 is a schematic representation of a system according to one embodiment of the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

The present disclosure contemplates the fabrication of titanium nitride (TiN) nanofurnaces. TiN is a refractory (high temperature stable) material that exhibits metallic properties in the visible and near-infrared ranges and CMOS compatibility, which makes TiN preferable as an alternative to traditional noble metals such as gold and silver for use as a thermoplasmonic material. Plasmonic TiN nano-antennas have been suggested and demonstrated in interconnects, second-harmonic generation, heat-assisted magnetic recording, water evaporation, plasmon-enhanced photoelectrochemical water splitting, and as broadband absorbers for solar-thermophotovoltaics. Notably, recent investigations on temperature-dependent optical properties of plasmonic materials has revealed that at temperatures above 400° C. the figures of merit of localized surface plasmon resonances (LSPR) and propagating surface plasmon polaritons (SPP) in thin TiN films become nearly the same as those of polycrystalline noble metals. The TiN nanofurnaces disclosed herein take advantage of these optical properties, along with the exceptional hardness, thermal structural stability, and chemical inertness, of TiN to produce efficient and robust solar-thermal devices. A schematic representation of one embodiment of practical utilization of the present disclosure is shown in FIG. 1.

Fabrication of Plasmonic Nanofurnaces

Figure 2:
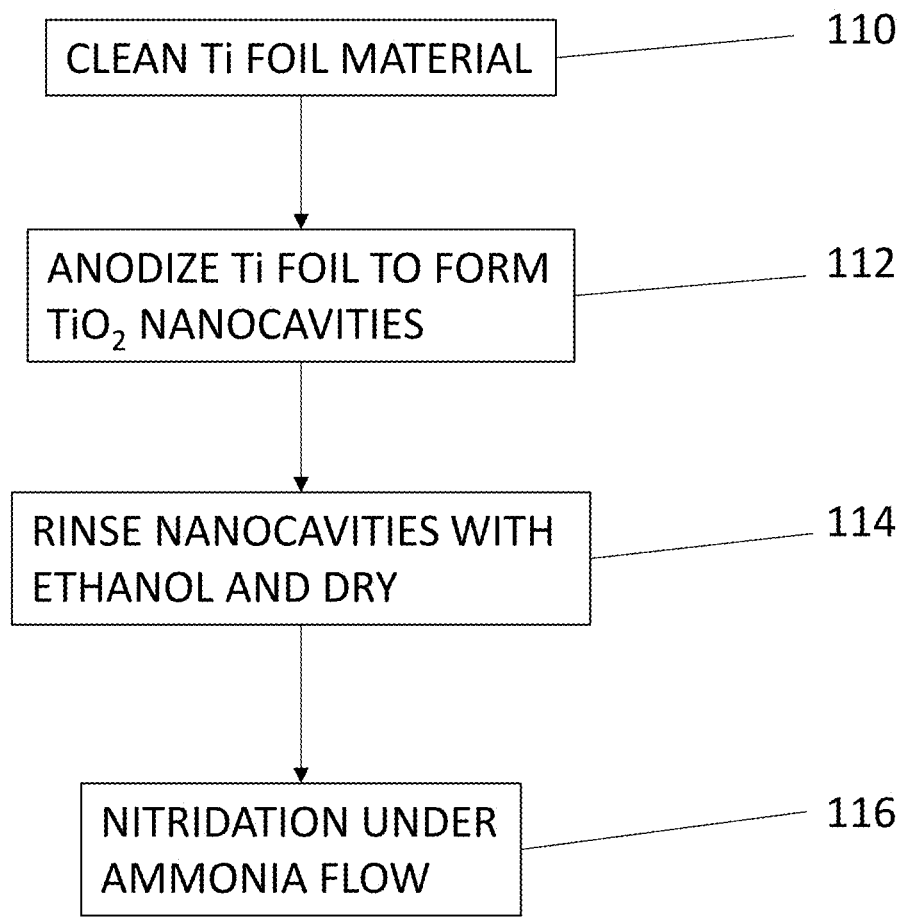
FIG. 2 is a flowchart of steps according to a method of the present disclosure.
Figure 3A:
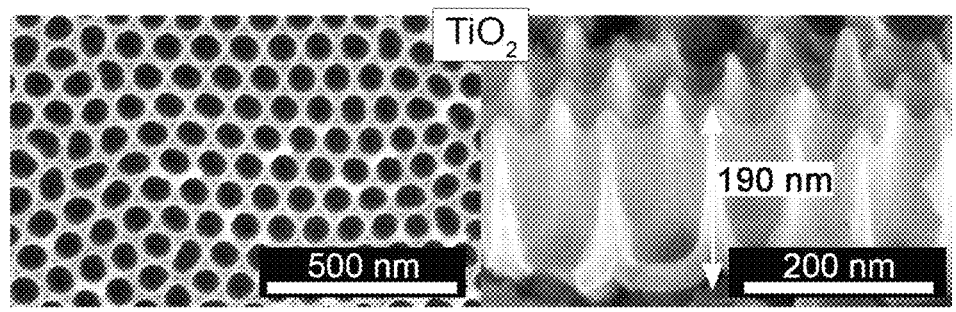
FIG. 3a is a scanning electron microscopy image of the nano-structure formed at a step of the present method.

According to one embodiment, the TiN nanofurnaces are fabricated through a multistep process in the flowchart of FIG. 2. Initially, in Step 110, Ti foils are cleaned in acetone, ethanol and deionized water solutions under sonication. The titanium foil can have a thickness of 0.1-1 mm, with a preferred thickness of 0.125 mm. Thereafter, in Step 112, the Ti foils are anodized to form $TiO_2$ nanocavities. The anodization of Step 112 is carried out in a hot acidic electrolyte inside a two-electrode electrochemical cell by using a platinum foil as the counter electrode and Ti as the working electrode. The electrolyte is a mixture of hot hydrofluoric acid (HF) and phosphoric acid ($H_3PO_4$), with the concentration of the HF in the $H_3PO_4$ being 3 Molarity (3 m HF) in a preferred embodiment. A DC voltage is applied across the working and counter electrodes, with the DC voltage being in the range of 10-30 VDC, for 1-3 hours. In a specific embodiment, anodization is performed at 15 VDC for two hours. The anodization process produces highly homogenous $TiO_2$ nanocavity arrays that self-organize into close-packed hexagonal lattices, as shown in the micrograph shown in FIG. 3a. It is noted that anodization is an economical and easily scalable technique that can be used to produce nanostructures over large areas. After anodization, in step 114, $TiO_2$ nanocavity samples are rinsed with ethanol and dried under nitrogen stream. In Step 116, $TiO_2$ nanocavities are converted to TiN in an ammonia atmosphere. In certain embodiments, the nitridization occurs at a temperature of 500-700° C., preferably at 600° C., under an ammonia flow of 5-10 mL/minute, preferably 7 mL/minute, for 20-30 minutes, preferably 25 minutes.

It is noted that a crystalline $TiO_2$ sample can be prepared for a reference by annealing the $TiO_2$ nanocavities at 450° C. for one hour in air, using rapid thermal annealing. In addition, a reference sample, referred to herein as 'TiN flat', can be fabricated by annealing $TiO_2$ nanocavities at 900° C. under ammonia flow for 10 minutes to induce the collapse of the nanofurnaces.

Figure 3B:
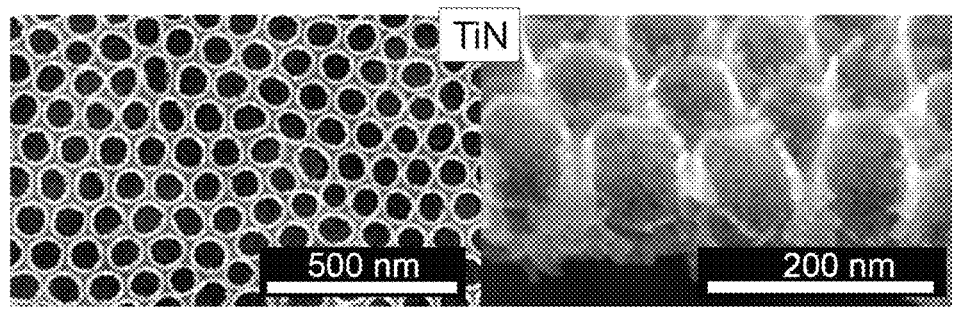
FIG. 3b is another scanning electron microscopy image of the nano-structure formed at a step of the present method.

Upon nitridation, the TiO2 nanostructured films turn from pale blue to dark green or violet depending on the nanofurnace length (in the range of 150-200 nm), suggesting the formation of plasmonic TiN. After ammonia treatment, the $TiO_2$ nanocavities are fully nitridized to TiN nanofurnaces with an average diameter of 80 nm, length of 180 nm, wall thickness of about 20 nm and center-to-center distance of 100 mm, as shown in the micrograph of FIG. 3b, resulting in nanocontainers with ~750 zeptoliter volume. During the conversion of $TiO_2$ to TiN, a 42% shrinkage of crystal cell volume introduces a strong mechanical stress in the nanostructures, which is released upon the transformation of the closed-packed $TiO_2$ nanocavities to the TiN cylindrical nanofurnaces with slightly separated walls.

Figure 4A:
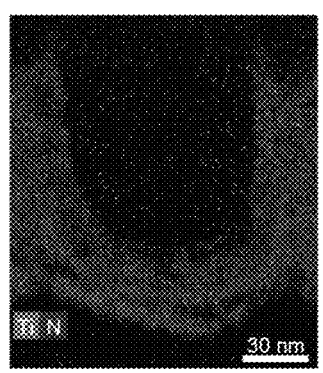
FIG. 4a is a high resolution electron microscopy image of a lamellae of a TiN film fabricated using the method of FIG. 2.
Figure 4B:
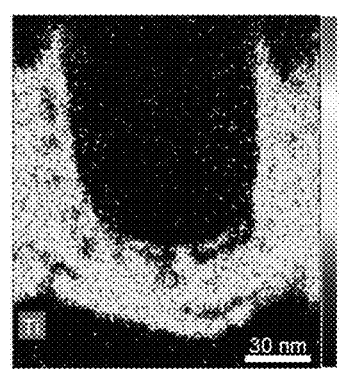
FIG. 4b is another high resolution electron microscopy image of a lamellae of a TiN film fabricated using the method of FIG. 2.
Figure 4C:
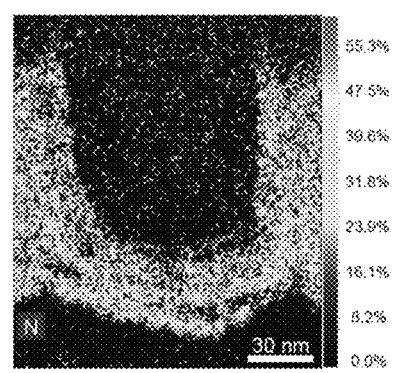
FIG. 4c is yet another high resolution electron microscopy image of a lamellae of a TiN film fabricated using the method of FIG. 2.
Figure 4D:
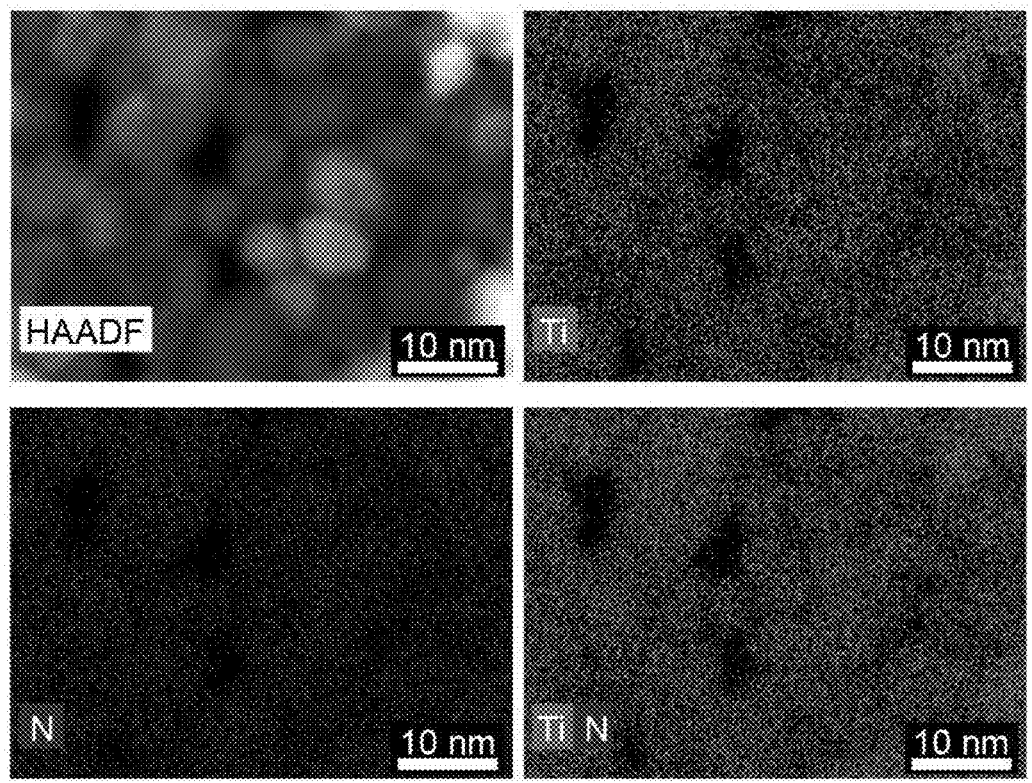
FIG. 4d includes high angle annular dark field scanning TEM image and EDS elemental mapping for Ti and N of crystallites forming the bottom of a TiN nanofurnace fabricated using the method of FIG. 2.

FIGS. 4a-4c show high-resolution transmission electron microscopy (HRTEM) images obtained by energy dispersive x-ray spectroscopy (EDS) elemental mapping of a lamellae of TiN thin film produced according to the method described above. These images of a single TiN nanofurnace reveal that nitridation introduces a certain degree of porosity, both on the bottom and on the walls of the nanocontainers, which may influence optical losses of plasmonic devices prepared in this manner. Moreover, the superimposed titanium and nitrogen mapping shows their even distribution at atomic resolution (FIG. 4c), while the deconvoluted elemental maps (FIG. 4d) highlight that TiN nanofurnaces are composed by an equal amount (50%) of Ti and N, which can be expected for stoichiometric TiN. Interestingly, micrographs taken at the bottom of a single TiN nanofurnace highlight the polycrystalline nature of its walls, which are formed by crystallites having an average size of 9 nm, as shown in FIG. 4d. This morphological feature may affect surface plasmon dissipation. FIG. 4d shows high angle annular dark field (HAADF) scanning TEM image and EDS elemental mapping for Ti and N of crystallites forming the bottom of a single TiN nanofurnace.

Figure 5:
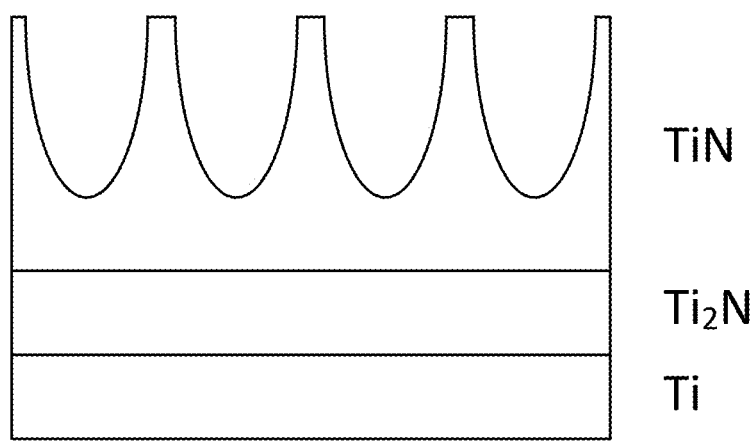
FIG. 5 is cross-sectional representation of an array of TiN nanofurnace array with additional layers.

Further morphological analysis reveals that during nitridation, the gradient diffusion of ammonia through the solid surface of the samples results in the formation of multilayer films including pure cylindrical TiN nanofurnaces and a $Ti_2N$ thermal layer with thickness of ~1 μm sitting on top of a Ti substrate, as depicted in the diagram of FIG. 5. Moreover, exposing the TiN nanostructures to air can lead to a 1 nm $TiO_2$ oxidation layer on the outer surface of the structure.

Optical Properties of the Plasmonic Nanofurnaces

Figure 6A:
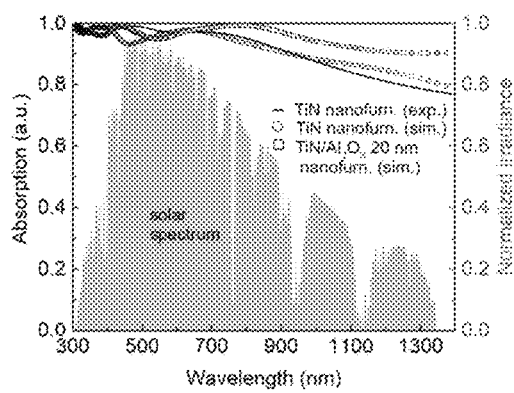
FIG. 6a is a graph of the absorption spectrum of a TiN nanofurnace according to the present disclosure.

An important feature to achieve efficient nanoscale heat generation is related to the optical response of the plasmonic nanofurnaces disclosed herein. Total transmission (T) and reflection (R) from plasmonic absorbers on glass are usually measured experimentally and then the absorption is retrieved by using 1-T-R. In this case, the use of an optically thick 125-μm Ti foil hinders light transmission so absorption is defined as 1-R (transmission is 0) for the purpose of analyzing the optical properties of the nanofurnaces disclosed herein. FIGS. 6a-6e illustrate some of the optical properties of the TiN nanofurnaces generated in accordance with the exemplary method described herein. FIG. 6a shows the experimental absorption spectrum of the refractory TiN nanofurnaces disclosed herein (solid line) measured at normal incidence. TiN nanofurnaces are broadband absorbers capturing AM 1.5 G solar spectrum (shaded area of the spectral graph) with near unity efficiency, showing above average absorption of 98% over the visible range (380-700 nm) and reaching a maximum peak of 99% at 470 nm. The absorptivity slightly decreases to 95% over the wider wavelength range of 300-1100 nm, while it significantly drops to 77% if the upper wavelength limit is extended to 1400 nm. It can be seen that the experimental results are in good agreement with the simulation for normal light incidence, represented by the lower line of circles. A possible method to maintain light absorption above 90% is to deposit a 20 nm layer of a dielectric material, such as $Al_2O_3$ on the surface of the nanofurnace. As shown in FIG. 6a, the modified nanofurnace (represented by the upper line of circles) maintains the average absorption above 96% in the range 300-2000 nm. The addition of this dielectric layer may also act as a protective layer against TiN oxidation.

Figure 6B:
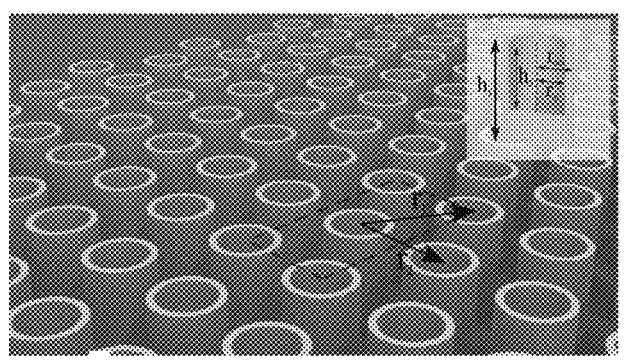
FIG. 6b is a perspective representation of a TiN nanofurnace array according to the present disclosure.
Figure 6C:
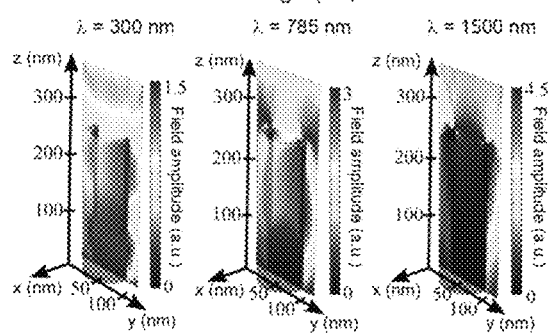
FIG. 6c is a series of maps showing the electric field distribution achieved by the TiN nanofurnaces of the present disclosure at three excitation wavelengths.
Figure 6D:
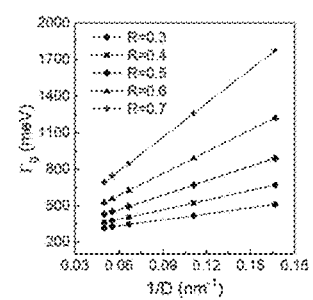
FIG. 6d is a graph of electron relaxation rate (Γg) and electron relaxation time (τg), respectively, as a function of grain size.
Figure 6E:
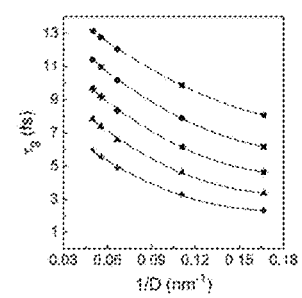
FIG. 6e is another graph of electron relaxation rate (Γg) and electron relaxation time (τg), respectively, as a function of grain size.

FIG. 6b shows a schematic of the nanofurnace array used to obtain the simulated optical results. The array includes a plurality of TiN nanofurnaces on a $Ti_2N$—Ti substrate. Each nanofurnace is a closed cylindrical structure with inner radius $I'_m$=30 nm and outer radius $r_{out}$=45 nm. The total height of the furnace is $h_1$=250 nm, while the inner height is $h_2$=165 nm. The nanofurnace array forms a hexagonal lattice, with r1=√3a and r2=a, where a=165 nm. The substrate is a multilayer structure that consists of a $Ti_2N$ layer with thickness 1 μm, sitting on top of a Ti substrate. FIG. 6c shows a simulated absolute value of electric field amplitude distribution for three different excitation wavelengths— $\lambda_1$=300 nm (pure cavity resonance), $\lambda_2$=785 nm (hybrid resonance) and $\lambda_3$=1500 nm (off-resonance) applied to the nanofurnace array, which illustrates how localization varies upon the excitation of different optical modes. FIG. 6d shows the electron relaxation rate ($\Gamma_g$) and FIG. 6e shows the electron relaxation time ($\tau_g$) dependence on inverse grain size (1/D) calculated with the Mayadas-Shatzkes model at different values of the electron reflection coefficient (R).

Broadband absorption occurs due to light coupling into resonant cavity modes of the nanofurnace array. Resonant behavior is determined by the fundamental waveguide mode of the cylindrical TiN nanofurnaces, characterized by the corresponding cutoff wavelength (k). Radiation with wavelengths smaller than $\lambda_c$=1130 nm is effectively coupled into cavity modes and enhanced absorption occurs due to the prolonged interaction time and material losses of TiN nanofurnace walls. Some of the excited modes are standard cavity modes (pure cavity resonance), while some of them are hybrid cavity and surface plasmon polariton (SPP) modes (hybrid resonance). Such coupling also contributes to the increased absorption. The radiation with wavelengths larger than $\lambda_c$ is forbidden from entering the nanofurnaces; hence, the main contribution into the absorption spectrum occurs due to localized surface plasmon resonance (LSPR) (off-resonance condition).

The resonance excited at 300 nm corresponds to pure high order cavity mode, which is characterized by four nodes and two antinodes having different E-field intensity distributions. Excitation of the pure modes produces efficient light-matter interaction, which leads to the highest absorption in the visible range (99% at 470 nm). The combination of high density of cavity modes of nanofurnace array and the plasmonic nature of TiN leads to broadband absorption across the visible and near-IR ranges, centered at 785 nm and with full-width-half-maximum of 700 nm. The exceptionally high broadening of this resonance may be the result of the roughness and presence of voids in TiN nanofurnaces as shown in the cross-sectional HRTEM images (FIGS. 4a-c). From electric field (E-field) distribution at 785 nm (FIG. 6c) it can be seen that along first order cavity mode, the SPP waves propagating along the vertical sidewalls of the nanofurnaces are excited. Otherwise, absorption at the off-resonance conditions ($\lambda_3$=1500 nm) is due to LSPR on the corners of the nanofurnaces, which leads to significant reduction of the absorption.

From this picture of the optical properties of the nanofurnaces of the present disclosure, certain strategies for tuning light-matter interaction in these TiN nanofurnaces emerge. First, simulations of optical absorption cross section of a single TiN cylindrical waveguide reveal that increasing the nanofurnace radius or diameter results in an absorption cross section enhancement and a shift of $\lambda_c$ toward longer wavelengths. One approach for modifying the nanofurnace diameter is through the implementation of an imprinting step prior Ti anodization. Another approach involves the electrolyte in the anodization step. As discussed above, the electrolyte is a mixture of hydrofluoric acid and phosphoric acid (3 M HF in $H_3PO_4$). This HF concentration produces nanocavity diameters of about 80 nm. It has been found that the diameter of the $TiO_2$ nanocavity can be varied by changing the HF concentration in the electrolyte. Lower HF concentrations, in the range of 1-2M, produce nanocavity diameters greater than 80 nm, although with an inhomogeneous arrangement of nanotubes. Increasing the HF concentration to 4-5 M produces diameters less than 80 nm, although the resulting film resembles an electropolished surface rather than the nanotubular structures of the preferred concentration (3 M). It is noted that increasing the anodization voltage can lead to significant increases in diameter, in some cases up to 200-250 nm. In this instance, the structure is arguably no longer a nanocavity and is therefore less usable as a nanofurnace.

A second strategy contemplates depositing an ultrathin layer of a dielectric inside the nanofurnaces, as discussed above for the case of $Al_2O_3$. This method may influence the fundamental waveguide modes, SPP modes and their hybridization, and can be easily implemented with the aid of physical vapor deposition techniques.

An additional strategy to manipulate the light-matter interaction includes tuning the electron relaxation rate (F), which is a fundamental parameter of surface plasmons quantifying the overall quality of the resonances and, at the same time, influencing surface plasmon dissipation into heat. The electron relaxation rate is the damping constant in the Drude term of the complex dielectric permittivity, and it is inversely proportional to the intraband electron relaxation time ($\tau$)—i.e., $\Gamma$=h $\tau^{-1}$ where h is Planck's constant. The relaxation rate has contributions from electron-electron scattering, electron-phonon scattering, scattering at grain boundaries, impurity and defects scattering, and surface roughness scattering. For thin films (i.e. thickness above 50 nm) it is commonly accepted that grain boundaries have little effect on Drude damping of conducting materials because the grain size is usually comparable or much larger than the electron mean free path. This is the usual picture for the majority of plasmonic films fabricated by e-beam deposition. However, the TiN nanofurnace films according to the present disclosure are processed through a nitridation step that produces polycrystalline films with grain size (6-20 nm), which is much lower that mean free path of TiN, i.e. ≈45 nm, and which is tunable depending on the processing temperature. Within this grain size regime, grain boundary scattering contribution to optical properties becomes relevant and relaxation times ($\tau_g$), as well as relaxation rates ($\Gamma_g=\tau_g^{-1}$), could be estimated by using the quantitative model introduced by Mayadas. In this model, grain boundaries are modelled as N parallel partially reflecting planes located perpendicular to the electric field E, and placed an average random distance apart corresponding to the average grain diameter (D). These reflecting planes are identified with scattering potentials, inside of which electron scattering is described by a relaxation time ($\tau_g$). Therefore, for this geometry, the solution of the linearized Boltzmann equation, which uses the electron-transition rate computed by perturbation theory, applying Fuchs boundary conditions, read as:

$$\tau_g^{-1} = \tau_0^{-1} + \frac{1.37 v_F R}{D(1-R)} \qquad (1)$$

where $\tau_0^{-1}=\Gamma_0$ is the relaxation rate for infinite grain size, which is retrieved from fitting of experimental ellipsometry measurements at room temperature on single crystalline TiN thin films and is 230 meV, $D_F=7\times10^5$ m s$^{-1}$ is the Fermi velocity for TiN, and R is the electron reflection coefficient at grain boundaries. The grain boundary reflection coefficient, R is often taken to be 0.5 as a first approximation, but values between 0.3 and 0.7 has been previously reported.

FIG. 6d is a graph of the values of $\Gamma_g$ for the TiN nanofurnaces disclosed herein as a function of grain size. This graph shows that $\Gamma_g$ is strongly influenced by grain scattering in the films disclosed herein. For D=6 nm, scattering at grain boundaries indeed induces $\Gamma g$ to be almost two times (513 meV, R=0.3), four times (819 meV, R=0.5), and eight times (1772 meV, R=0.7) the reference value of TiN single crystal. The values found for TiN nanofurnaces are unusually high, especially if compared with $\Gamma_g$ of gold nanostructures, which have been reported to be between 30 and 90 meV for a crystal size range of 200-40 nm. As expected, the TiN nanofurnaces of the present disclosure have a very short electron relaxation time, as reflected in the graph of FIG. 6e. The value of $\tau_g$ is 4.6 fs (R=0.5) for D=6 nm, for instance is three time less than typical values reported for silver and gold.

The unusually high values of $\Gamma_g$ and low values of $\tau_g$ suggest, on the one hand. that TiN nanofurnaces have high optical losses, and, on the other hand, that heat generation through momentum dissipation of conducting electrons is favorable in the TiN nanofurnaces of the present disclosure and may be controlled by tuning the grain size.

Solar-to-Heat Energy Conversion in the Thermoplasmonic Nanofurnaces

Figure 7A:
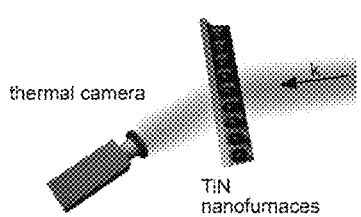
FIG. 7a is a diagram of an arrangement to detect temperature variations in the TiN nanofurnace disclosed herein under solar radiation.
Figure 7B:
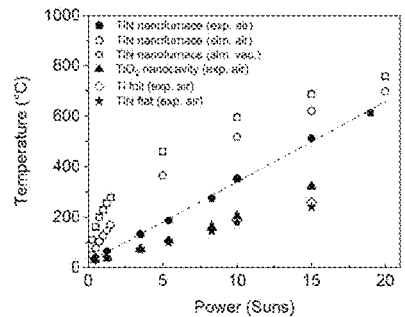
FIG. 7b is a graph of solar-induced heat generation of the TiN nanofurnace and other related structures.

To assess the thermoplasmonic performance of the nanofurnaces disclosed herein, samples are excited at normal incidence and an infrared (IR) camera is placed on the back of nanofurnace films at a 30° angle (FIG. 7a) to detect temperature variations under solar irradiation. Each measurement is performed in air and is taken once steady-state temperature is reached and corrected by IR emissivity values. The solar-induced thermoplasmonic heat generation of the samples is shown in the graph of FIG. 7b, as represented by the dashed line. (The datapoints above the dashed line represent the results of simulations of the TiN nanofurnaces). The graph shows temperature as a function of solar power expressed in Suns (1 Sun=100 mW cm$^2$). As shown in the graph, the TiN nanofurnace of the present disclosure outperforms nanofurnaces produced by $TiO_2$ nanocavities, Ti foil and TiN flat reference samples, which are represented by the circles below the dashed line.

Figure 7C:
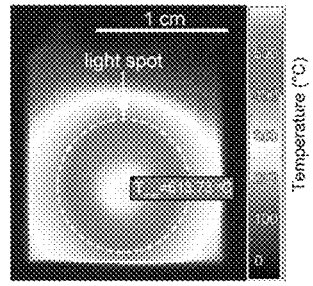
FIG. 7c is an infrared camera image of the thermal gradient of a TiN nanofurnace under solar radiation.
Figure 7D:
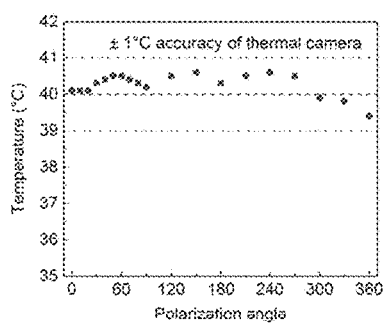
FIG. 7d is a graph of heat generation as a function of polarization.
Figure 7E:
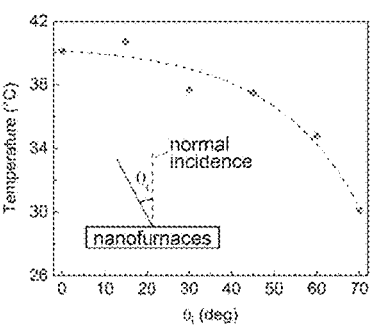
FIG. 7e is a graph of heat generation as a function of incidence angle.

FIG. 7c shows an experimental infrared camera image of the thermal gradient departing from the illuminated central spot for TiN nanofurnaces under 19 Suns. Two operational parameters to consider for solar energy conversion devices are (i) the influence of the polarization state of light, and (ii) the angle of incidence on the absorption and heat generation of structural components. These characterizations were performed with a 785 nm laser at 105 mW. As expected, polarization-dependent excitation generates a temperature of 40±1° C. at all linear polarization angles (FIG. 7d), in agreement with the absorption data. The nanofurnaces of the present disclosure, due to their cylindrical symmetry, represent the ideal polarization-insensitive case for solar-thermal devices. On the other hand, thermoplasmonic TiN nanofurnaces show a significant dependence on incidence angle ($\theta_i$) between 70° and 40° (FIG. 7e), while showing almost constant response for angle≤40° up to normal incidence.

In the specific experiment, when 19 Suns of illumination power impinges the TiN nanofurnace film of the present disclosure, an extremely high solar thermoplasmonic temperature of 613° C. is reached. The outstanding performance of the TiN nanofurnaces disclosed herein is further highlighted when it is recognized that similar temperatures may be reached only by using a laser with $10^6$ greater power density. Despite the high thermal conductivity of the Ti substrate for the TiN nanofurnace disclosed herein, high temperatures above 600° C. were generated in the experiment. This thermal performance leaves room for improvements in heat management by thermally isolating the TiN nanofurnaces with substrates that can sustain high temperatures but have low thermal conductivity, such as quartz, glass wool and fiber/foam glass.

The TiN nanofurnaces disclosed herein show a power-dependent heating of 32.55° C./Suns as opposed to a flat TiN film which shows only 14.51° C./Suns, Ti foil with a rate of 15.85 and a $TiO_2$ nanocavity with 19.95° C./Suns. Even if a modified slope is calculated that accounts for absorbed light flux, the TiN nanofurnaces exhibit a heating rate of 37° C./Suns versus a 30° C./Suns rate for the TiN film, Ti foil and $TiO_2$ nanocavity. The TiN nanofurnaces take 20-30 sec to reach steady state temperature generation, thus presenting a heating/cooling rate of ~25° C./sec and demonstrating an exceptional resistance to thermal stress. This efficient light-to-heat conversion rate is one of the key properties of the nanofurnace disclosed. This high rate is ensured by the proper optical response of the structure (i.e., broadband absorption) and by the large mode overlap of the cavity modes with the highly lossy plasmonic material. Specifically, the mode analysis of the cavity modes shows that most of the energy is absorbed inside the thick plasmonic walls of the TiN nanofurnace. This leads to high local heat generation rates, which are essential for photocatalytic reactions. In this regard, the TiN nanofurnaces disclosed herein are superior to photonic crystal structures that are not capable of efficient local heat generation.

Interestingly, the maximum temperatures reached follow a linear dependence on TiN grain size, confirming the intimate relation among electron scattering at grain boundaries, dissipation of electron momentum, and thermoplasmonic heat generation.

These experimental results on solar thermoplasmonic heating are confirmed by finite-element heat transport simulations under different excitation wavelengths of solar spectrum. Dissipated power is determined for each wavelength ($Q_i$), while total dissipated power ($Q_{tot}$) is determined by integration of $Q_i$ over broadband solar spectrum, according to the equation:

$$(x,y,z) = \int_{\lambda_{min}}^{\lambda_{max}} Q_{tot}(x,y,z) d\lambda. \tag{2}$$

Afterwards, the total dissipated power is applied as a heat source to the quasi-static heat transfer problem. The total dissipated power inside a TiN nanofurnace decreases in the order Q1 ($\lambda_1$=300 nm)>Q2 ($\lambda_2$=785 nm)>Q3 ($\lambda_3$=1500 nm) as expected from the E-field intensity distribution maps (FIG. 6c). For $\lambda_1$=300 nm, exciting the pure cavity mode, the power is dissipated all along the nanofurnace walls with a significant amount of losses also generated inside the nanofurnace base. A similar situation is verified for the cavity-SPP hybrid resonances ($\lambda_2$=785 nm) that, however, induce nearly no dissipation in the base of the nanofurnace. Conversely, the third excitation at 1500 nm (LSPR mode) produces only marginal power dissipation spreading over the nanofurnace edges.

When considering broadband solar illumination, the simulated generated temperatures in air (represented by the upper line of circles in FIG. 7b) for increasing solar power excitation that differ slightly from the experimental values represented by the dashed line. However, at higher solar power the difference among experimental and simulated values is only 50-70° C. The slight discrepancy between the simulated and the experimental temperatures may reflect the mismatch between TiN nanofurnaces film size (2 cm×1.5 cm) and the diameter of the focused light beam (~1 cm) during the experiments. Furthermore, we utilize a Fresnel lens to focalize solar light, and this set-up typically provides a strong gradient in light focus mirrored by a gradient of generated temperatures, as shown in the IR thermal image of FIG. 7c.

To expand on the evaluation of the solar-to-heat conversion efficiency of the present nanofurnaces, the thermal losses associated with convection and radiation channels are computed, and then the thermoplasmonic solar-to-heat conversion efficiency ($\eta_{STP}$) is estimated. Conduction losses are negligible because samples are suspended through a metallic clamp positioned on the samples border, where metal foils are close to room temperature. Convection losses (Pconv) are given by $$P_{conv} = hA(T-T_0) \tag{3}$$

where h=10 W m$^{-2}$ K$^{-1}$ is the heat transfer coefficient, A=1 cm$^2$ is the surface area of the nanofurnaces, T is the thermoplasmonic temperature generated in the nanofurnaces, and $T_0$ is room temperature.

Radiative losses ($P_{rad}$) are computed by integrating the black body radiation spectrum at the temperature generated inside the nanofurnaces over wavelength by taking into account the spectral dependent emissivity function, and are given by $$P_{rad} = A \int_{\lambda_{min}}^{\infty} \varepsilon(\lambda) I_{BB}(\lambda, T) d\lambda \qquad (4)$$

where $\varepsilon(k)$ is the emissivity of the nanofurnace surface, and $I_{BB}$ is the black body irradiance at operational temperature, which reads as $$I_{BB}(\lambda, T) = \frac{2\pi h c^2}{\lambda^2} \frac{1}{\exp\left(\frac{hc}{\lambda k_B T}\right) - 1} \qquad (5)$$

where $h = 6.626 \times 10^{-34}$ J s and $k_B = 1.381 \times 10^{-23}$ J K$^{-1}$ are the Planck and Boltzmann constants, respectively, and $c = 2.998 \times 10^8$ m s$^{-1}$ is the speed of light.

Using Kirchhoff's law, which states that emissivity of the surface is equal to absorption, the nanofurnace absorption spectrum is computed by using the experimental TiN complex dielectric permittivity measured at high temperatures, and by using simulated absorption values (emissivity) in the computation of $P_{rad}$. Finally, the thermoplasmonic solar-to-heat conversion efficiency ($\eta_{STP}$) is computed, which is given by $$\eta_{STP} = \frac{P_{in} - P_{conv} - P_{rad}}{P_{in}} \times 100 \qquad (6)$$

Therefore, for the case when TiN nanofurnaces operate in air at 15 Suns irradiation ($P_{in} = 1.5$ W for an area of 1 cm$^2$) generating 520° C., the thermal losses correspond to $P_{conv} = 0.495$ W and $P_{rad} = 0.480$ W. In these conditions, $\eta_{STP}$ (air)=35%, while ruling out convective heat transfer losses (i.e. vacuum conditions) gives $\eta_{STP}$ (vacuum)=68%.

Interestingly, when the TiN nanofurnaces reach high temperatures in air, a surface TiO$_2$ layer readily forms and the proper working mechanism is compromised, thus not sustaining the maximum temperature for a prolonged time. In stark contrast, when operating the TiN nanofurnace under inert gas (Ar) or vacuum atmosphere, the bulk composition, surface properties and morphology are perfectly retained.

Conformal Hematite Deposition with the Thermoplasmonic Nanofurnaces

Figure 8:
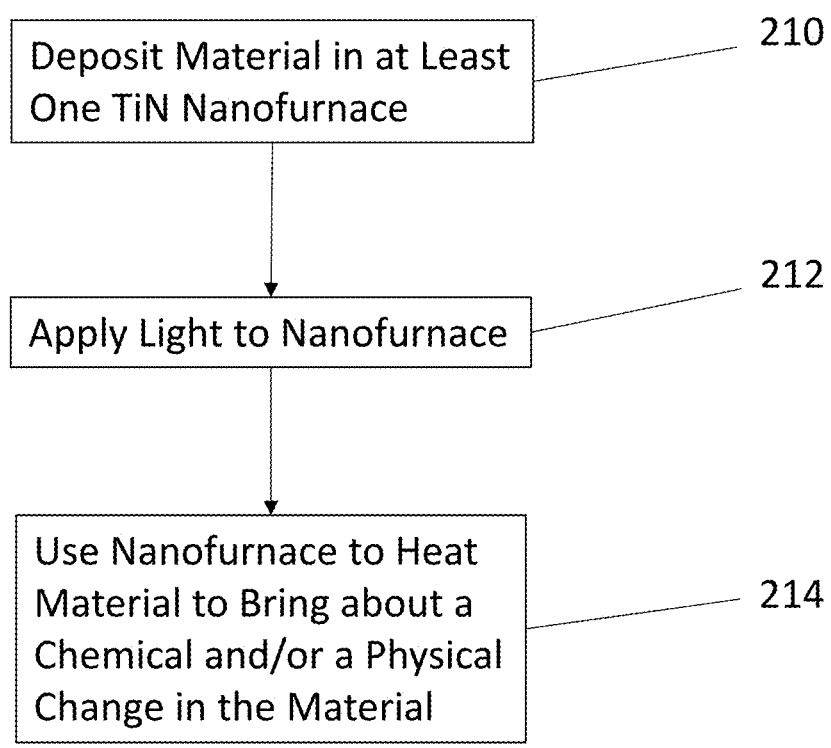
FIG. 8 is flowchart of another method according to the present disclosure.

An exemplary usage of the nanofurnaces generated by the above described methods is shown in flowchart of FIG. 8. In general, the method includes, in Step 210 depositing a first material in at least a first titanium nitride nanofurnace disposed on a titanium film, the titanium nitride nanofurnace having an open top, a titanium nitride bottom, and a titanium nitride tubular middle portion extending from the open top to the titanium nitride bottom. As discussed below, the first material may be organometallic material. The method then includes, in Step 212, applying light to the titanium nitride nanofurnace. In Step 214, the titanium nitride nanofurnace uses the applied light to heat the portion of the first material therein to bring about at least chemical and/or physical change in the portion of the first material.

Figure 9A:
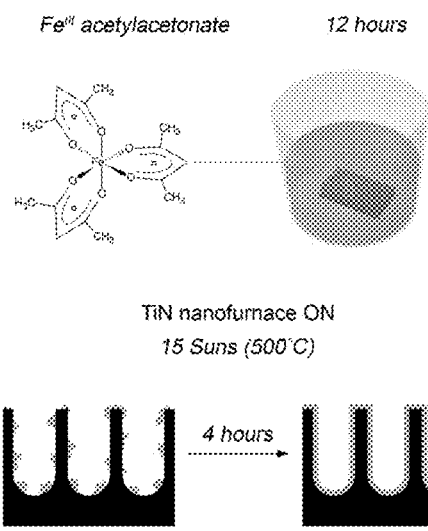
FIG. 9a is a cross-sectional representation of the method of FIG. 8.
Figure 9B:
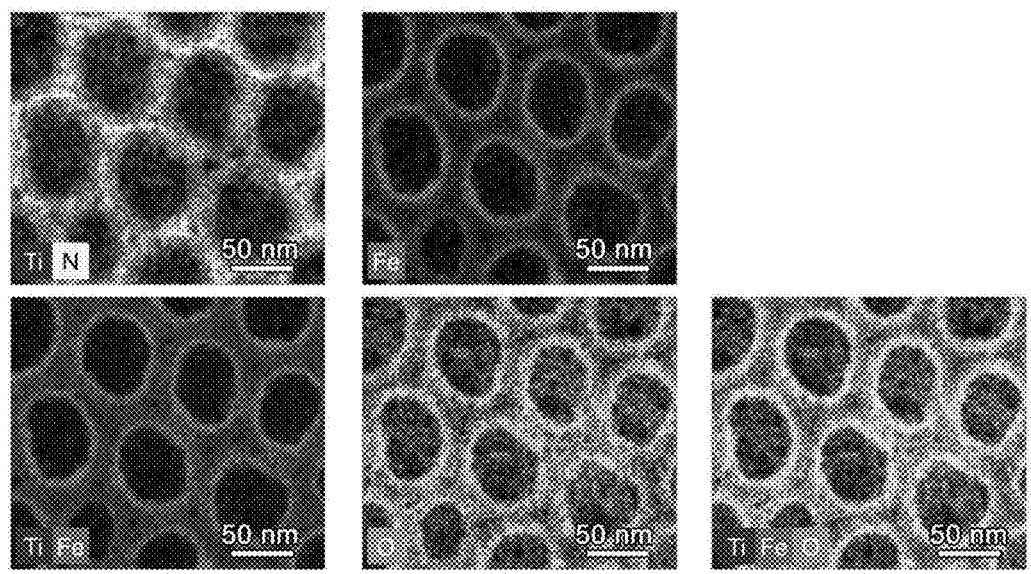
FIG. 9b is a collection of high angle annular dark field scanning TEM images and EDS elemental mapping images of the nanofurnace after the method of FIG. 8.

In one example of the operations of FIG. 8, the thermoplasmonic melting of an inorganic deposit under concentrated solar light (FIG. 9a) is carried out. The nanofurnaces films are immersed in a concentrated acetone solution of Fe$^{III}$(acac)$_3$ (iron acetylacetonate) for 12 hours, and then rinsed with acetone before drying under nitrogen flow. This processing step induces the precipitation of sub-micrometric particles on top of the nanofurnaces and irregular deposits inside the nanofurnaces, without affecting the average diameter of each aperture. Notably, TiN nanofurnaces generate high thermoplasmonic temperatures of above 600° C. under the illumination of 15 Suns in vacuum for four hours (at $\eta_{STP} = 68\%$), and melt down the Fe deposit, resulting in a 10-nm-thick conformal coating. This feature demonstrates that the deposit forms in plasmonic hot spots of TiN nanofurnaces, where heat dissipation is maximized. HAADF-STEM and EDS elemental mapping images evidence the atomic homogeneity of the overlayer deposition at a sub-nanometer scale (FIG. 9b). The micrographs reveal that (i) the nanofurnace walls are covered by an iron oxide layer (see the brighter area in the Fe and O maps of FIG. 9b); (ii) oxygen is mostly concentrated on the Fe layer; (iii) the nanofurnaces preserve the initial Ti and N atomic distribution after four-hour illumination under vacuum conditions (as shown by the brighter area in the Ti—N combined map of FIG. 9b). Rietveld refinements on XRD patterns did not show either iron-containing phases or TiO$_2$.

Figure 9C:
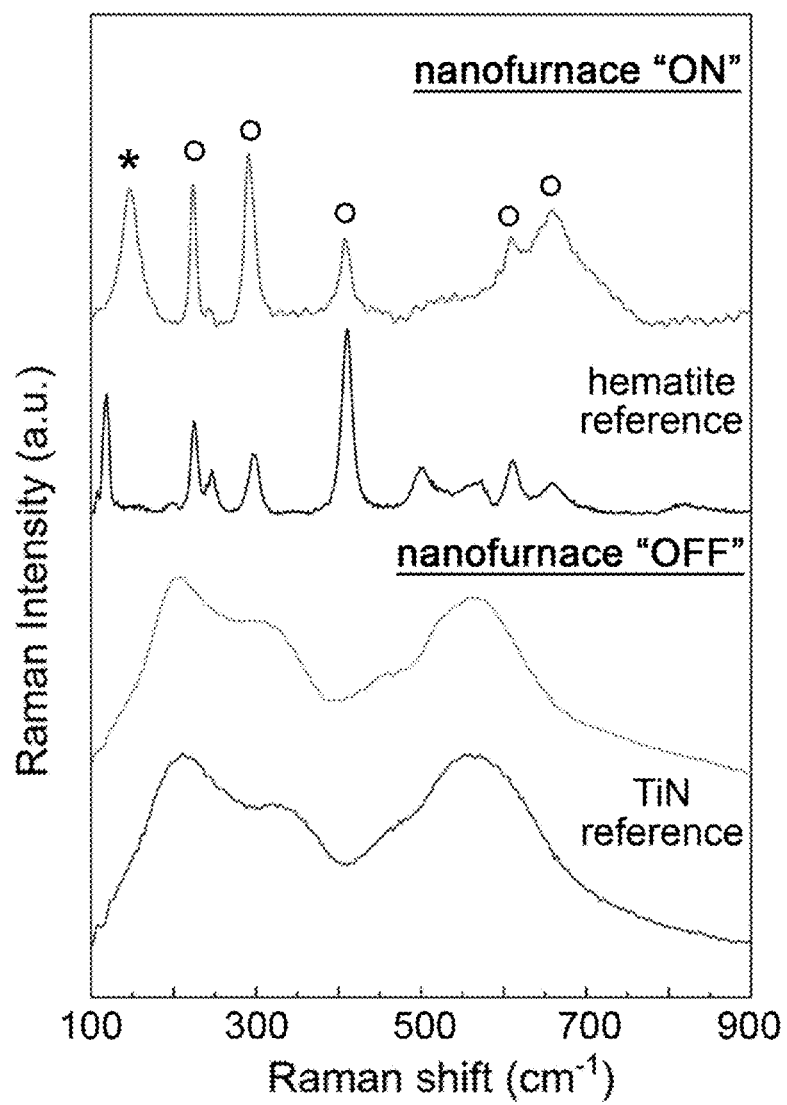
FIG. 9c is a graph of surface composition of the TiN nanofurnace and related structures after the method of FIG. 8.

Several areas on different samples before and after irradiation (FIG. 9c) are analyzed to identify the iron oxide phase deposited onto the surface of TiN nanofurnace walls. Raman spectroscopy reveals that, when the nanofurnace is in OFF state (i.e., without irradiation), only the fingerprint of TiN is detected, as represented by the second line in the graph. In contrast, after the nanofurnace has operated in the ON state (i.e., under light irradiation at 15 Suns), as represented by the upper line in the graph, sharp and well-defined peaks typical of hematite ($\alpha$-Fe$_2$O$_3$) appear, along with an additional peak denoting the formation of anatase TiO$_2$, probably growing at the interface between TiN and $\alpha$-Fe$_2$O$_3$. The black circles above the upper line denote hematite bands, while the asterisk highlights the bands assigned to anatase TiO$_2$. Furthermore, the Raman spectrum on nanofurnaces that have experienced the thermal cycle shows two very intense peaks due to the D and G bands of graphitic materials, demonstrating that temperatures generated inside the nanofurnaces induce the degradation of both the organometallic Fe precursor and the superficial adventitious carbon, catalyzing the formation of new C—C bonds.

These findings illustrate the capability of TiN nanofurnaces to generate high thermoplasmonic temperatures under concentrated solar light. Primarily, nanofurnaces produce the decomposition of an iron organometallic precursor and drive the formation of new C—C bonds. Thereafter, the nanofurnaces are capable of melting and re-depositing a conformal layer of crystalline hematite.

Solar-Thermal Heterogeneous Catalysis Using the TiN Nanofurnace

Figure 10:
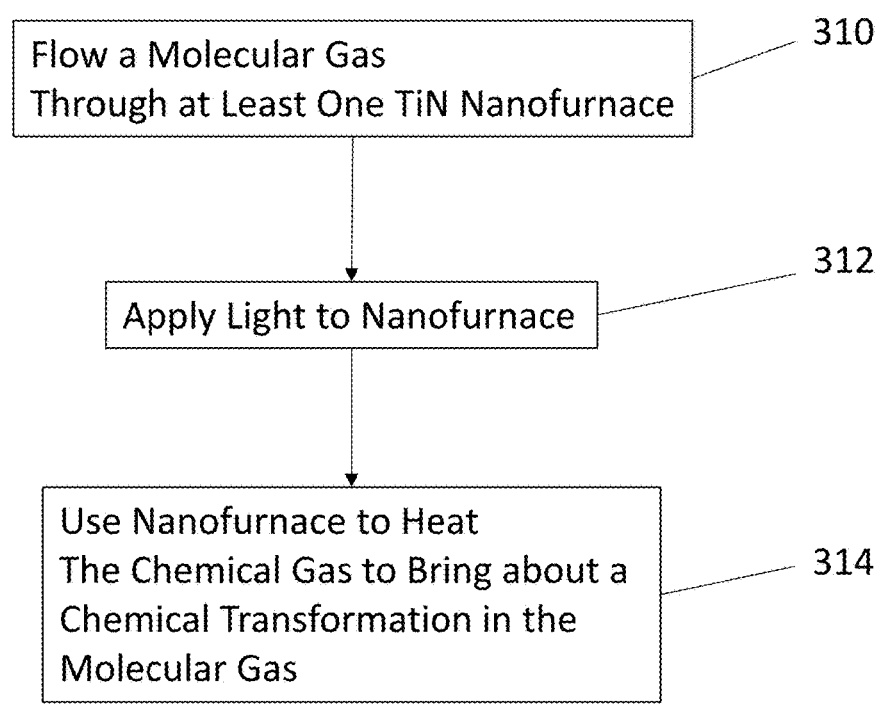
FIG. 10 is flowchart of another method according to the present disclosure.

Another exemplary usage of the nanofurnaces generated by the above described methods is shown in flowchart of FIG. 10. In general, the method includes, in Step 310 flowing a first molecular gas in at least a first titanium nitride nanofurnace disposed on a titanium film, the titanium nitride nanofurnace having an open top, a titanium nitride bottom, and a titanium nitride tubular middle portion extending from the open top to the titanium nitride bottom. As discussed below, the first molecular gas may be carbon monoxide. The method then includes, in Step 312, applying light to the titanium nitride nanofurnace. In Step 314, the titanium nitride nanofurnace uses the applied light to heat the first molecular gas therein to bring about a chemical transformation of the first molecular gas.

In one example of the operations of FIG. 10, a model CO oxidation reaction promoted by different solar intensities can be used to demonstrate the use of the TiN nanofurnaces disclosed herein for solar thermal catalysis. FIG. 11a shows a TiN nanofurnace decorated with catalytic nanoparticles for heterogeneous catalysis. Rh nanoparticles are deposited by immersing a nanofurnace film in ultrapure water containing $RhCl_3$ as a metal precursor, which was then reduced to $Rh^0$ by the addition of an aqueous solution of ammonia borane. As a result, Rh nanoparticles with size of 3-5 nm are homogeneously distributed over the interior surface of the TiN nanofurnaces film as shown in FIG. 11b depicting the EDS elemental for Ti and Rh of a single TiN nanofurnace. In the example, the Rh nanoparticles were deposited both on the mouth and on the inner part of the thermoplasmonic cavity.

The prepared TiN/Rh nanofurnaces were tested in the CO oxidation to $CO_2$ by generating different temperatures at varying light intensities, as shown in the graph of FIG. 11e. In dark conditions, appreciable amount of $CO_2$ was observed. However, during solar irradiation the $CO_2$ formation rate increased rapidly and reached a plateau of ~16 mol $h^{-1}$ $m^{-2}$ of $CO_2$ at ~9 Suns irradiation and at a generated temperature of ~325° C. At the same time, a stoichiometric $O_2$ conversion was observed. The conversion activity for CO oxidation was always in the range 93-95%.

Notably, the light intensity dependence of the $CO_2$ generation rate follows the sigmoidal shape typical of thermally activated catalytic processes. The thermoplasmonic TiN nanofurnaces activated Rh nanoparticles that catalyzed the CO oxidation, with naked TiN nanofurnaces that did not show any significant activity, i.e., 0.24 mol $h^{-1}$ $m^{-2}$ at 15 Suns irradiation generating a temperature above 500° C. The $\eta_{STP}$ of the nanofurnaces during the CO oxidation was determined under the conditions at which the catalytic conversion rate reached 50% of the final value, i.e., light intensity of 6.7 Suns and temperature of 235° C. When the TiN nanofurnaces operate in air under 6.7 Suns irradiation and generate a temperature of 235° C., the thermal losses are $P_{conv}$=0.21 W and $P_{rad}$=0.037 W. Thus, $\eta_{STP}$(air)=63%, and when excluding $P_{conv}$ (which do not occur in vacuum) $\eta_{STP}$(vacuum)=94.5%. Considering that the CO gas molecules may affect the convection losses similarly to air, the TiN/Rh nanofurnaces catalyzed CO oxidation at a solar-to-heat conversion efficiency of 63%.

In order to evaluate the nanofurnace stability, TiN nanofurnaces were tested in CO oxidation after a treatment with an accelerated aging protocol under 15 Suns irradiation and flowing CO and $O_2$. The catalytic conversion rate reached 50% of the final value at a light intensity of 8.4 Suns and a temperature of 291° C., thus showing a partial deactivation with respect to the pristine sample and likely associated to the beginning of TiN oxidation as suggested by XPS analysis. Notably, if the TiN nanofurnaces were treated, instead, with an accelerated aging protocol under Ar, they showed very minor structural modifications, suggesting their higher stability for reaction performed in reducing conditions such as the challenging and environmentally relevant hydrogenation of carbon dioxide and ammonia synthesis.

The present disclosure should be considered as illustrative and not restrictive in character. It is understood that only certain embodiments have been presented and that all changes, modifications and further applications that come within the spirit of the disclosure are desired to be protected. Further details of the experimental embodiments, results of those experiments and the physical and chemical properties of the TiN nanofurnaces fabricated and evaluated in those experiments are included in Appendices A and B accompanying this application. The entirety of both Appendices A and B are incorporated herein by reference.

The invention claimed is:

1. A thermoplasmonic device, comprising:
    a titanium film;
    a plurality of titanium nitride tube elements disposed on the titanium film, each of the titanium nitride tube elements having an open top, a titanium nitride bottom, and a titanium nitride tubular middle portion extending from the open top to the titanium nitride bottom;
    wherein at least some of the plurality of titanium nitride tube elements have a length from the open top to the titanium nitride bottom of 150 nm to 200 nm.

2. The thermoplasmonic device of claim 1, wherein at least one of the plurality of titanium nitride tube elements has a diameter of approximately 80 nm.

3. The thermoplasmonic device of claim 2, wherein the at least one of the plurality of titanium nitride tube elements has a wall thickness of approximately 20 nm.

4. The thermoplasmonic device of claim 1, wherein at least some of the plurality of titanium nitride tube elements have a wall thickness of approximately 20 nm.

5. The thermoplasmonic device of claim 4, wherein the center-to-center distance between at least two adjacent titanium nitride tube elements is approximately 100 nm.

6. The thermoplasmonic device of claim 1, wherein the center-to-center distance between at least two adjacent titanium nitride tube elements is approximately 100 nm.

7. The thermoplasmonic device of claim 1, further comprising a conformal layer of crystalline hermatite inside at least one of the titanium nitride tube elements.

8. A thermoplasmonic device, comprising:
    a titanium film;
    a plurality of TiN tube elements disposed on the titanium film, each of the TiN tube elements having an open top, a TiN bottom, and a TiN tubular middle portion extending from the open top to the TiN bottom; and
    a $Ti_2N$ later disposed between the titanium film and the plurality of titanium nitride tube elements.

9. The thermoplasmonic device of claim 8, wherein at least some of the plurality of TiN tube elements have a length from the open top to the titanium nitride bottom of 150 nm to 200 nm.

10. The thermoplasmonic device of claim 8, wherein at least some of the plurality of TiN tube elements have a diameter of approximately 80 nm.

11. The thermoplasmonic device of claim 8, wherein at least some of the plurality of TiN tube elements have a wall thickness of approximately 20 nm.

12. The thermoplasmonic device of claim 8, wherein the center-to-center distance between at least two adjacent TiN tube elements is approximately 100 nm.

13. The thermoplasmonic device of claim 8, further comprising a plurality of crystallites formed on the bottom of at least one of the plurality of TiN tube elements.

14. A thermoplasmonic device, comprising:
    a titanium film;
    a plurality of titanium nitride tube elements disposed on the titanium film, each of the titanium nitride tube elements having an open top, a titanium nitride bottom, a titanium nitride tubular middle portion extending from the open top to the titanium nitride bottom, and a plurality of crystallites formed on the titanium nitride bottom; and
    a conformal layer of crystalline hermatite inside at least one of the titanium nitride tube elements.

15. The thermoplasmonic device of claim 14, where at least some of the plurality of crystallites has a diameter of approximately 9 nm.

16. The thermoplasmonic device of claim 14, wherein at least some of the plurality of titanium nitride tube elements have a length from the open top to the titanium nitride bottom of 150 nm to 200 nm.

17. The thermoplasmonic device of claim 16, wherein at least one of the plurality of titanium nitride tube elements has a diameter of approximately 80 nm.

18. The thermoplasmonic device of claim 14, wherein the at least one of the plurality of titanium nitride tube elements has a wall thickness of approximately 20 nm.

19. The thermoplasmonic device of claim 18, wherein at least one of the plurality of titanium nitride tube elements has a diameter of approximately 80 nm.

* * * * *